United States Patent Office 3,504,249
Patented Mar. 31, 1970

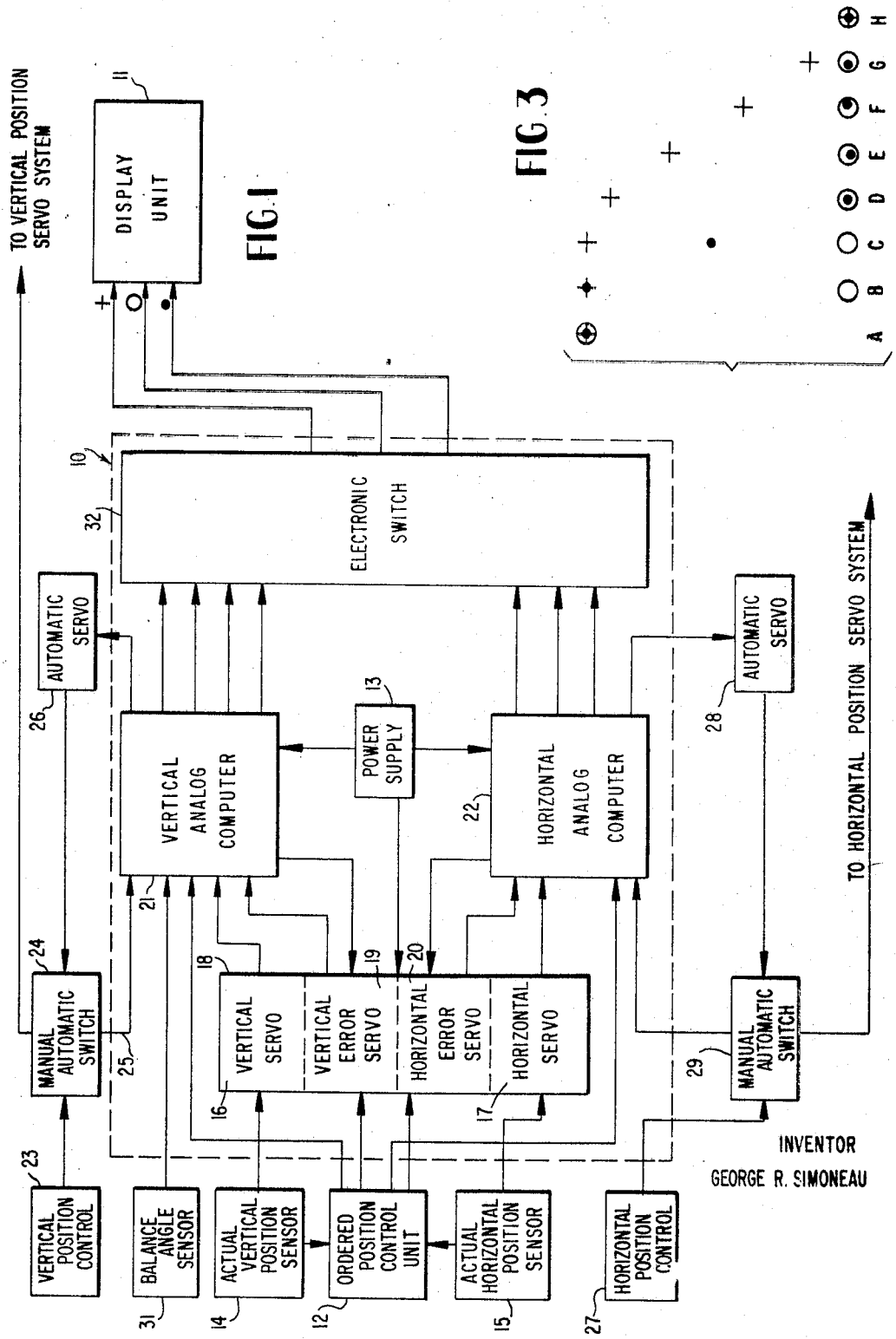

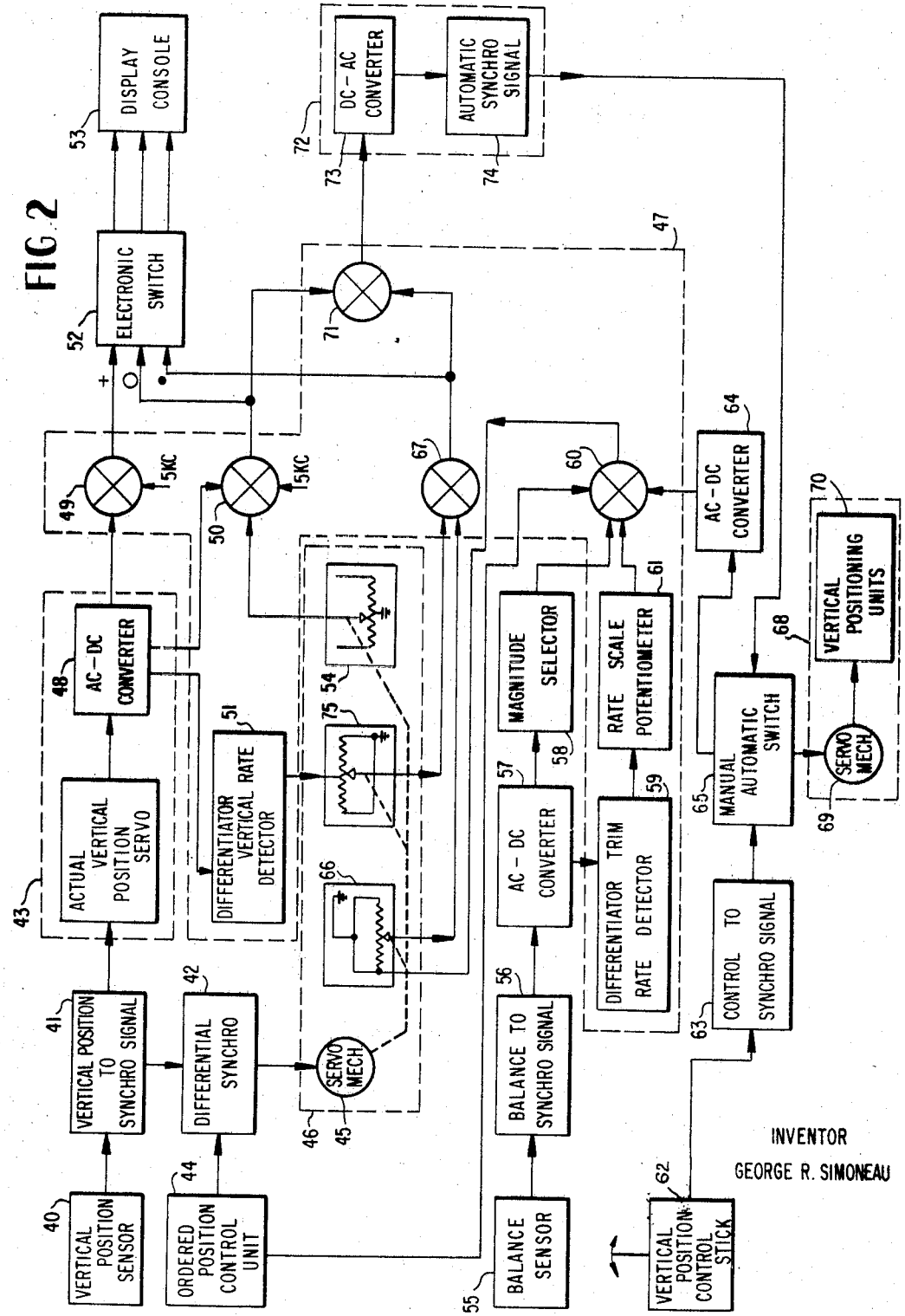

3,504,249
NON-LINEAR QUICKENED MONITOR AND
CONTROLLER
George R. Simoneau, Norwich, Conn., assignor to General
Dynamics Corporation, New York, N.Y., a corporation
of Delaware
Original application Sept. 17, 1964, Ser. No. 397,125.
Divided and this application May 16, 1968, Ser.
No. 729,658
Int. Cl. G05b 15/02
U.S. Cl. 318—18　　　　　　　　　　　　　　　8 Claims

ABSTRACT OF THE DISCLOSURE

A control arrangement for poitioning a dynamic system is provided by generating signals representative of the actual position of the dynamic system, generating signals representative of the ordered position of the dynamic system, differentiating the actual position signal, and utilizing the combination of the differentiated signal and the error signal to control the operation of the dynamic system.

The invention herein described was made in the course of or under a contract with the Department of the Navy.

This is a division of application Ser. No. 397,125 filed Sept. 17, 1964, now Patent No. 3,422,418.

This invention relates to control and display systems in general and more particularly to control and display systems limited in speed of operation only by inherent time delays.

This invention further relates to manual or automatic control systems provided to establish a unified control signal derived from a plurality of variables indicating the position of a dynamic system and relates to display systems provided to present a visual indication generally representative of a controlled system's actual position, response to an ordered change of position, and desired location.

Remote control of dynamically sluggish systems and/or control of dynamic systems, such as an aircraft, spacecraft, or submarines, generally require specially designed instrumentation for observation of the actual location and orientation of the controlled object with respect to a desired location and orientation. Without the use of such specially designed instruments, environmental operating condition and human limitations often render the operator physically helpless to view directly the actual position of the dynamic system and to guide it to a desired position.

The speed of prior art methods of maneuvering dynamic systems has been confined to the maximum attainable rapidity of human mental processes incident to visually scanning a plurality of instruments, registering and correlating the information received, and instituting an appropriate corrective change in control. Thus, in prior art systems, the human mind functions, in effect, a computer performing differentiation and integration processes. In the present invention, all the mental differentiation and integration required to produce a desired change of location and position of a dynamic system is removed by enabling the operator to act merely as a simple amplifier in a control system loop.

In terms of the development in prior control methods applied to submersible vehicles, the advantages of utilizing the control and display system of the present invention, to direct the movements of any dynamically sluggish system, can be easily illustrated.

At one time submarines were controlled by three operators and two supervisors. The operators were the helmsman, the bow planesman, and the stern planesman, and the supervisors were the Conning Officer and the Diving Officer. After considering all the operating commitments, the Conning Officer made the decision relative to the proper course and depth that should be maintained. From an analysis of water conditions and vehicle weight distribution, the Diving Officer decided what trim angle was necessary to maintain, or change, depth. The helmsman maintained course by observing a gyro compass repeater and by calculating the proper rudder angle necessary to hold the submarine on course. The bow planesman viewed a depth gauge and computed the proper angle of the bow planes required to keep the submarine on depth, or to change depth. By viewing a trim angle indicator, the stern planesman determined the desired trim angle for the stern planes. Frequently, a trial and error method was employed to locate the correct position of all the controls to maintain, or attain, a desired course and depth. Although some men became very adept at the trial and error porcedures on one ship, they had to be retained when transferred to another ship with a different mass and different control surfaces.

In addition to the forestated disadvantages of the trial and error method, as the speed of submarines became faster, it became difficult to coordinate the functions of all the men to create an efficient operation. Consequently, with the advent of the faster modern submarines, the controls have been consolidated into a single stick-type control mechanism. The operation has therefore become easier, but the individual operator's job is harder. The single operator is required to watch all the instruments that formerly were observed by three men and to make decisions once made by four others. Additional instruments have been added to help the operator make decisions, but this has increased the physical task for one man requiring him to watch the indication presented on a larger number of instruments.

Within the contemplation of the present invention, a computer weighs the effects of several instrument indications relative to what effect each factor will eventually have on the motion of a dynamic system. The weight given to each factor will vary with the amount of error between the parameters indicating the actual position of the object to be controlled and parameters representing an ordered position. The resultant weighted signals are added and presented in suitable form on a visual display device. Ordered, or desired, change of position, actual position, and dynamic system response may be suitably represented on the same display surface.

Preferably, this invention contemplates the application of a single cathode ray oscilloscope to present a dot mark, a circle, and a cross mark on the surface of a cathode ray tube indicating a controlled dynamic system's response, ordered position, and actual position respectively.

When employing an automatic mode of operation to control the motion of the dynamic system, the operator merely selects the desired position parameters, and the ordered position is achieved and maintained without his moving the controls.

To manually control the motion of the dynamic system, the operator selects the desired position parameters just as they were selected in the automatic mode; however, in the preferred embodiment, the operator manipulates the controls to center the dot in the circle. By centering the dot in the circle, the operator directs a command to the units which control the motion of the dynamic system. The commanded motion control units are then oriented appropriately to achieve the desired change of position. Displacement of the dot above, below, to the right, or to the left of center of the circle indicates to the operator that the controlled system is progressing in a direction away from the desired position. Thus, as the system approaches its ordered position, the operator holds or adjusts his controls appropriately to maintain the dot concentric with the circle.

During operation in either the automatic or manual mode, as the system moves toward its desired location, the computer constantly re-evaluates the weight assigned to the difference between the actual and desired parameters. In this manner, the position of the dot within the circle gives a constant indication of the accuracy of the dynamic system's progress toward its ordered position.

Thus, in determining what control action is best, since the display provides the necessary information, it is no longer essential for the operator to employ trial and error judgments based on the knowledge attained by previous experience and the indications observed on multiple displays. With the aid of the control and display system of the present invention, throughout the period of time required to effect a change of position, the operator of a dynamic system is informed by the movement of the dot when and how to move his controls. Therefore, any factor which tends to affect the location of the dynamic system will cause a movement of the dot indicating to the operator what corrective steps are necessary to maintain the desired direction of motion.

Thus, the present invention contemplates complete control for changing, or maintaining, the position of a dynamic system. By employing the rate of change of actual position and the error, or difference, between actual position and ordered postion to produce control of a dynamic system, the effective control of the system will be independent of speed and characteristics of the controlled dynamic system and independent of methods employed to change position of the dynamic system.

Although previous reference has been made to the adaptability of the present invention to the control of submarines, it is in no way intended that such reference be construed to limit the present system to the control of submersible vehicles. The previous description, the drawings, the language, hereinafter employed, are presented merely to illustrate one general embodiment of an application of the present invention. Application of the described system to control any dynamic system with inherent time delays is within the contemplation of the present invention.

It is therefore recognized that the control and display system described in the specification and claims may be employed to control and observe the motion of any dynamically sluggish unit capable of movement in either a single dimension or in plural dimensions. Although it is feasible to employ the present invention to control the motion of a dynamic system capable of movement in only a single dimension, or in two dimensions, such as, for example, units incapable of departing from the surface of either land or water, the preferred application of the present invention resides in the control and display of the motion of dynamic systems capable of rendering some type of motion in all three arithmetic dimensions. Thus, the present invention finds particular application in the control of aircraft, spacecraft, submersible vehicles, a gun turret and barrel, cranes, or any other system whose motion can be described in terms of two mutually orthogonal planes oriented in any manner with respect to the horizon. Consequently, the terms "horizontal" anl "vertical" as employed in the specification are not intended to limit the application of the present invention.

It is therefore a primary object of this invention to provide the operator of a dynamic system with a control and display system which will reduce the operator's task to simple corrective motions of his control to change, or maintain, the position of the dynamic system consistent with an indication of actual position and desired position as observed on a visual display.

A further object of this invention is to reduce the number of display instruments in the control panel of a complex dynamic system to one integrated display unit. With all information required for effective control, centrally and easily located, human scanning time and visual fatigue are reduced.

Another object of this invention is to reduce the training time necessary to enable an operator to master the numerous maneuvers required when controlling a dynamic system.

Another object of this invention is to provide a control system which will operate fully automatically with operator monitoring or will operate manually with operator controlling and monitoring.

An additional object of this invention is to provide a control system capable of producing effective control independent of dynamic characteristics of units under control, of speeds at which they are traveling, and of methods used to produce control.

With the foregoing and other objects in view, this invention resides in the following specification and appended claims, certain details of construction being illustrated in the accompanying drawings in which:

FIGURE 1 is a general block diagram of an overall control and display system within the contemplation of the present invention;

FIGURE 2 is a schematic diagram illustrating more specifically the components of a basic computer unit employed in the system of FIGURE 1;

FIGURE 3 is an illustration of the indications presented on a display surface within the contemplation of the present invention.

Referring now more particularly to the drawings, there is illustrated in block form in FIGURE 1 the basic components which are included within the control and display system of the present invention, an overall computer unit is represented generally by the units enclosed within the dotted area designated by numeral 10. Input signals to computer unit 10 are obtained from a dynamic system's attitude sensors, from manual or automatic controls, and from ordered position controls. The input signals thus derived are converted in computer unit 10 to a useable form to generate signals to be applied to a display unit 11 and to a control loop for automatic operation.

Display unit 11 functions to present actual and ordered position symbols and control symbols to the operator of a controlled dynamic system. Preferably, unit 11 includes a cathode-ray oscilloscope capable of representing a dynamic system's actual position by a cross (+) mark, a dynamic system's ordered position by a circle (O), and a quickened control symbol in the form of a dot (·). Optionally, the display unit including a cathode-ray oscilloscope is capable of presenting a signal, represented in the form of a bar (—), which is five times more sensitive than the quickened control dot symbol. An ordered position control unit 12 is employed by an operator to establish the desired limits and orders for computer unit 10. Unit 12 is connected to computer unit 10 to supply input signals which are indicative of the position at which it is desired to locate the controlled dynamic system. Unit 12 may be provided with suitable means, such as handcranks and digital readout indicators, for ordering and observing desired position parameters.

Basically, the control and display system of the present invention is provided with the above described primary units; namely, the computer unit 10, the display unit 11, and the ordered position control unit 12. With the aid of appropriate voltages and proper connections from power supply 13, three basic functions are included in the overall performance of computer unit 10; servo-mechanical conversion of electrical signals, analog computation, and electronic switching. Attitude sensing units 14 and 15, calibrated to detect the actual vertical and horizontal coordinates, respectively, of a dynamic system, are connected to supply synchro signals to servo section 18 in computer unit 10. Vertical position sensing unit 14 is connected to a vertical position servo unit 16 in servo section 18 and horizontal position sensing unit 15 is connected to a horizontal position servo unit 17 in servo section 18. In the event that the control and display system of the present invention is employed in the steering and diving control system on a submarine, the ship's attitude sensing units preferably produce three-wire synchro signals indicative of such parameters as course, depth, trim, rudder angle, and plane angle.

Attitude sensing units 14 and 15 are also connected to the ordered position control unit 12. In unit 12 the difference between the actual position parameters and ordered position parameters is obtained. Differential synchro signals are subsequently applied to a vertical error servo unit 19 and a horizontal error servo unit 20 in servo section 18 of computer unit 10. Thus, a vertical position error signal, from ordered position control unit 12, is applied to vertical error servo unit 19, and a horizontal position error signal from ordered position control unit 12 is applied to horizontal error servo unit 20.

Preferably, servo section 18 therefore consists of four separate, servo units: a horizontal position servo, a horizontal error position servo, a vertical position servo, and a vertical error position servo. Each of the servo units in section 18 is preferably a motive control servo system including a synchro transmitter and synchro receiver operatively connected to convert synchro signals to suitable direct current signals to be fed to analog computers in computer unit 10. Each of the servo units in section 18 may be provided with suitable connections to enable the units capable of plural speed operation. Connections which enable the servo units capable of plural speed operation are advantageous in attaining fine and coarse control of the servo units, in the event that the controlled dynamic system's attitude sensory units are provided with the capability of rendering synchro signals of differing sensitivity.

The signals obtained from horizontal servo unit 17 and the horizontal error servo unit 20 in section 18 are applied to a horizontal position analog computer 22 in computer unit 10. In like manner, the signals obtained from vertical servo unit 18 and vertical error servo unit 19 are applied to a vertical position analog computer 21. The analog computation performed in computers 21 and 22 may be provided by operational amplifiers and their associated circuits appropriately connected to perform a variety of computer functions. In the preferred embodiment of the present invention, the basic operational amplifier is a high gain direct current amplifier. By employing various combinations of input and feedback circuits, various mathematical computations, such as inversion, addition, multiplication, division, integration, and differentiation may be performed by the high gain D-C amplifiers.

Input signals to analog computers 21 and 22 in computer unit 10 are also obtained from the ordered position control unit 12 and from manual or automatic control units. A vertical position control unit 23, which enables an operator to manipulate a dynamic system's vertical positioning units, is connected to vertical analog computer 21 through a manual-automatic switch 24 and a suitable conductor 25. An automatic control loop from the output of analog computer 21, through an automatic servo unit 26 and manual-automatic switch 25, is also provided to supply an input to computer 21 via conductor 25. An output from switch 24 is applied to a vertical position servo system, which is employed to directly control the dynamic system's vertical positioning units. Through an appropriate setting of switch 24, manual control of the vertical position of a dynamic system may be accomplished by operator manipulation of vertical position controls in unit 23. Automatic control of the vertical position of a dynamic system may be attained by a different setting of switch 24 which enables the automatic servo unit 26 to be connected to the vertical position servo system. In like manner, manual or automatic control of the horizontal positioning units of a dynamic system may be achieved by similarly connecting a horizontal position control unit 27 and an automatic servo unit 28 to a manual-automatic switch 29. Outputs from switch 29 are applied to a horizontal position servo system and to horizontal analog computer 22. An output from computer 22 is supplied to automatic servo unit 28.

An input signal to vertical analog computer 21 may also be obtained from a balance angle sensing unit 31. The balance angle sensor preferably supplies a D-C signal to computer 21 indicative of a controlled dynamic system's attitude relative to a horizontal plane. In use on a submarine, balance sensor 15 includes a gyro system which functions as a trim detector.

The various input signals applied to analog computers 21 and 22 are applied to and acted upon by operational amplifiers in the computers to form unified output signals to be applied to an electronic switching device 32. Electronic switch 32 converts parallel output signals from computers 21 and 22 to serial form to provide properly sequenced input signals for application to display unit 11. The sequenced signals applied to display unit 11 activate unit 11 to present a symbolic indication of a controlled dynamic system's actual position, ordered position, and a quickened response indication. The quickened response indication presents a quicker observation of what effect a dynamic system's position control units will eventually have on the dynamic system's motion. In the event that display unit 11 is provided with a cathode-ray oscilloscope, the output signals from computers 21 and 22 and electronic switch 32 preferably establish the proper horizontal and vertical deflection voltages, bias voltages, and blanking pulses to be applied to the cathode-ray tube to produce a cross mark indicative of actual position, a circle indicative of ordered position, and a dot mark for the quickened response indication.

Referring now to FIGURES 1 and 8 and assuming that display unit 11 is provided with a cathode-ray oscilloscope, a particular method of control and display within the contemplation of the present invention may be easily illustrated and understood. If the cathode-ray oscilloscope is provided with a grid overlay, the actual and ordered position parameters of a controlled dynamic system in a given plane may be represented along the horizontal axis of the oscilloscope. On the vertical axis may be represented the dynamic system's actual and ordered position parameters in a plane orthogonal to the plane represented on the horizontal axis. Thus, if the control and display system of the present invention is employed on a submarine, the horizontal axis of the grid overlay on a cathode ray tube may represent degrees course and the vertical axis of the grid overlay may represent depth in feet.

Example A of FIGURE 3 illustrates a dynamic system proceeding in a given direction, or at rest at a given position: all symbols, circle, cross and dot are together. In Example B the ordered position, circle, has been changed. The operator observes that the dot is not within the circle and he adjusts the manual controls, Example C, to center the dot within the circle. When the dynamic system's positioning units attain the proper orientation to effect the desired change in position, the dot will become centered in the circle, Example D. During the period of time required to move the dynamic system to the desired position, the operator adjusts the controls appropriately to hold the dot in the center of the circle. In the event that positioning units of the dynamic system become orientated in a manner inconsistent with the proper orientation necessary to attain the ordered position, the dot symbol will move away from the center of the circle, Example E, thus rendering a quickened indication to the operator that an adjustment of the manual controls is necessary. External forces and/or traveling speed may also misdirect the progress of the dynamic system away from the desired direction. Such misdirection will also be observed by the dot's motion away from the center of the circle. In the event that the dynamic system commences to progress in a direction away from the ordered position, represented on the horizontal axis of the cathode ray tube, the dot will move to right or left of center of the circle, as illustrated in Examples F and G. The operator observing this error, or the automatic control loop sensing the error, merely adjusts the controls to center the dot in the circle, Example G. Similarly, commencement of the progress of the controlled dynamic system away from ordered position, represented on the vertical axis of the cathode-ray tube grid overlay, will be observed and corrected by the operator or the automatic control loop. A constant indication of the dynamic system's actual position is represented by the cross mark illustrated in FIGURE 3. When the dynamic system has attained its order position, the dot and cross will again both be centered in the circle, Example H.

Thus, in the preferred form of the present invention, A-C signals from attitute sensing units of a dynamic system to be controlled are received by a servo section and converted to D-C signals. The D-C signals are applied to D-C analog computers. Direct current signals are also applied to the analog computers from attitude sensing and balancing units. The analog computers combine and scale the received D-C voltages with other voltages developed in the computers to produce automatic control signals and signals for a display unit. The automatic control signals are fed to servo systems where they are converted to synchro signals. The synchro signals are fed to control loops to control the positioning units of the dynamic system. A number of outputs from the analog computers are coupled to an electronic switch which sequences the signals to the display unit. The sequenced signals are representative of actual position, ordered position, and a quickened response indication of the progress of the controlled dynamic system. Optionally, a signal five times more sensitive than the quickened response signal may also be supplied to the display unit. Manual operation to maintain, or change, position of the dynamic system may be achieved by an operator adjusting controls to hold the quickened indication on the display unit at a specified position relative to the ordered position indicaton. Observation of the actual position, ordered position and quickened indication on the display unit will indicate to the operator the progress of the dynamic system and the control action necessary.

The structural and functional characteristics of a preferred embodiment applicable to the above described system may best be presented with reference to FIGURE 2. Vertical position control of a dynamic system is represented and will be described. Horizontal position control may be accomplished in essentially the same manner.

A dynamic system's actual vertical position may be sensed mechanically in unit 40 and the mechanical motion obtained may be transmitted to unit 41 where it is converted to a synchro signal. In submarine control, the movement of a pressure-activated depth sensor will be transmitted to a conversion unit where a synchro signal is obtained. The output synchro signals from unit 41 are coupled to a differential synchro unit 42 and to a vertical position servo unit 43. A desired vertical position synchro signal obtained from an ordered position control unit 44 is also applied to differential synchro unit 42. Preferably, unit 42 includes six three-wire synchros which are employed to obtain the difference between the ordered position, introduced in unit 44, and the actual position, obtained from unit 40.

From the output of differential synchro unit 42, a signal representative of vertical position error is applied to a servo mechanism 45 in a vertical error servo unit 46. In servo units 43 and 46 the input synchro signals are preferably converted to direct current signals. An A-C to D-C conversion may be accomplished by coupling the shaft of a suitable servo mechanism to the wiper arm of one or more variable potentiometers. When the potentiometers are supplied with a D-C reference voltage, a D-C voltage proportional to the angular position of the shaft is obtained by the wiper arm at its tapped position on the potentiometer. Signals obtained from servo units 43 and 46 are applied to an analog computer 47.

An output signal from an A-C to D-C converter 48, in servo unit 43, is applied to operational amplifiers 49, 50 and 51 in analog computer 47. The signal applied to operational amplifier 49 is summed with a suitable reference signal, preferably a 5 kc. signal, to produce a signal representative of actual vertical position of a controlled dynamic system. From the output of operational amplifier 49, the actual position signal is applied to an electronic switching device 52 where it is sequenced with other signals for proper application to a display console 53.

Operational amplifier 51 is connected to function as a differentiator. The output signal from converter 48 in servo unit 43, applied to operational amplifier 51, is differentiated and the time derivative of the vertical position signal is obtained. Consequently, a rate of change signal of vertical position is established. The vertical rate signal derived from differentiator 51 is applied to a variable potentiometer 52 in vertical error servo unit 46. A wiper arm on potentiometer 52 is coupled to the shaft of servo mechanism 45 such that the reciprocal of the vertical rate signal input is obtained as a function of vertical error.

A potentiometer 54 in vertical error servo unit 46 is provided with a reference voltage applied across the ends of a resistance. The reference voltage is preferably a D-C voltage, and a wiper arm for the potentiometer is coupled to the shaft of servo mechanism 45. The voltage obtained from the wiper arm, in potentiometer 54, is directly related to vertical position error which operates servo mechanism 45. The resultant vertical error signal, obtained from potentiometer 54, is applied to operational amplifier 50. An output signal from converter 48 in servo unit 43 is also applied to operational amplifier 50. The actual vertical position signal from converter 48 and the vertical error signal from potentiometer 54 are combined in operational amplifier 50 with a suitable reference voltage, such as 5 kc., to produce a signal representative of the ordered position of a controlled dynamic system. The output signal from operational amplifier 50 is applied to electronic switching device 52 where it is sequenced for subsequent application to display console 53.

A balance sensor 55 detects the vertical orientation of a controlled dynamic system with respect to the horizontal. The resultant angular indication is converted to a synchro signal in unit 56 and the synchro signal is converted from A-C to D-C in converter 57. On a submarine, the input to unit 56 is obtained from the ship's gyro system indicating the attitude relative to the horizon. Preferably, converter 57 is a phase sensitive A-C to D-C converter which provides a voltage whose polarity indicates direction of balance angle and whose amplitude indicates amount of angle. The output signal from converter 57 is applied to a magnitude selector 58 and to an operational amplifier 59 in analog computer 47. Magnitude selector 58 preferably includes an amplifier and a selector switch for varying the gain of the amplifier. Thus, by appropriate adjustment of the selector switch, a signal representative of a desired, or ordered, balance angle may be obtained. The output of magnitude selector 58 is applied to operational amplifier 60 in analog computer 47.

Operational amplifier 59 is connected to function as a differentiator. Rate of change of balance, or balance rate, is thus represented by the time derivative output signal of differentiator 59. The magnitude of the balance rate signal is adjusted by scaling potentiometer 61 and is subsequently applied to operational amplifier 60.

From any suitable manual control device 62, a mechanical motion for vertical position control may be obtained and converted to a synchro signal in unit 63. With the appropriate setting of a manual-automatic switch 65, the synchro control signal from unit 63 is applied through switch 65 to an A-C to D-C converter 64 and to a vertical position servo system 68. The D-C control signal from converter 64 is applied to operational amplifier 60, and the A-C synchro control signal applied to servo system 68 is employed to activate a servo mechanism 69 in servo system 68. Servo mechanism 69 functions to appropriately adjust the controlled dynamic system's vertical positioning units 70 in accordance with the control instituted in device 62.

An additional input to operational ampilfier 60 may be obtained from the ordered position control unit 44. The signal from unit 44 to amplifier 60 is representative of a neutral balance angle about which the ordered angle from selector 58 may be caused to operate. Thus, by a suitable selector switch on unit 44, a neutral balance angle, other than zero, may be set into the control system to enable a controlled dynamic system to maintain a given vertical orientation independent of environmental conditions.

Signals representative of control, balance rate, ordered balance, and neutral balance are therefore combined in operational amplifier 60. The resultant unified signal is applied to a potentiometer unit 66 in servo unit 46. A wiper arm, transgressing a resistance in potentiometer unit 66, is coupled to the shaft of servo mechanism 45. Since the motion of servo mechanism 45 is controlled by a vertical error signal, the wiper arm in potentiometer 66 is automatically adjusted to keep the ratio and magnitude of the output signal from operational amplifier 60 related to vertical error.

The vertical rate signal from potentiometer 52 and the combined signal of control, balance rate, ordered balance, and neutral balance from potentiometer 66 are applied to and combined in operational amplifier 67 to form a quickened response signal output. The quickened response signal from amplifier 67 is applied to electronic switching device 52. Electronic switch 52 preferably includes a three-pole, multiposition switch and appropriate mechanical and electrical means to convert the parallel input signals from amplifiers 49, 50, and 67 to serial form. The serial output signals from switch 52 provide the proper input voltages for presenting the actual position, the ordered position, and the quickened response signal on display console 53.

The signal representing the ordered vertical position and the quickened response signal from operational amplifiers 50 and 67, respectively, may be applied to operational amplifier 71 where the signals are combined. In amplifier 71, a new voltage is formed which is applied to an automatic servo system 72. Servo system 72 may be provided with a D-C to A-C converter 73 and a unit 74 to establish an automatic synchro signal. An output from automatic servo system 72 is connected through the manual-automatic switch 65 to the vertical position servo system 68. With the appropriate setting of switch 65, the control and display system of the present invention may be operated in a manual or automatic mode.

In the preferred embodiment of the present invention, display console 53 is provided with a cathode-ray oscilloscope. The voltages applied to display console 53 are provided to establish the proper bias and deflection voltages to the cathode-ray tube to create a circle for ordered position, a cross for actual position, and a dot for the quickened response signal.

In the automatic mode, the amount of desired balance angle selected in magnitude selector 58 will not be exceeded. In the manual mode, the value selected for desired balance angle will not be exceeded, if the operator keeps the dot within the circle or between the circle and the dynamic system's actual position, as indicated by the cross. The dot's position on the display will direct the operator to make the necessary adjustment of controls to maintain both vertical position and neutral balance angle selected. If the operator allows the dot to go beyond the circle, less than optimum performance may result, and the controlled dynamic system may overshoot the ordered position. Preferably, therefore, an alarm may be provided to present an indication, in the event that the dot is held beyond the circle for an extended period.

What is claimed and desired to be secured by United States Letters Patent is:

1. A method of positioning a dynamic system having positioning units, comprising:
    (a) generating signals representative of the actual position of said dynamic system,
    (b) generating signals representative of the ordered position for said dynamic system,
    (c) differentiating at least one of the actual position signals,
    (d) generating position error signals in response to said actual position signals and said ordered position signals,
    (e) combining at least some of said actual position signals and said differentiated signals to generate a combined output signal,
    (f) adjusting the amplitude of said combined output signal in response to said position error signals, and
    (g) generating control signals for adjusting said positioning units in response to said adjusted amplitude signal.

2. A control arrangement for positioning a dynamic system having positioning units, said control arrangement comprising:
    (a) sensor means for generating signals representative of the actual position of said dynamic system,
    (b) means for generating signals representative of the ordered position for said dynamic system,
    (c) differentiator means for generating signals representative of the time derivative of at least one of said actual position signals,
    (d) control means for generaitng signals for adjusting said positioning units,
    (e) means responsive to said actual position signals and said ordered position signals for generating position error signals,
    (f) means for combining at least some of said actual position signals and said time derivative signals to generate a combined output signal,
    (g) means responsive to said position error signals for adjusting the amplitude of said combined output signal, and
    (h) means coupling said adjusted amplitude output signal to said control means.

3. The control arrangement according to claim 2 wherein said coupling means includes means for combining said adjusted amplitude output signal with at least one of said actual position signals, time derivative signals and ordered position signals.

4. The control arrangement according to claim 2 including:
    (i) means for presenting a visual indication of said ordered position, and
    (j) means responsive to said adjusted amplitude output signal for presenting a visual indication of the progress of said dynamic system from said actual position to said ordered position.

5. The control arrangement according to claim 4 wherein said control means includes:
    (i) manual means for generating adjusting signals,
    (ii) automatic means for generating adjusting signals, and
    (iii) switching means for selectively coupling said manual means and said automatic means to said positioning units, said automatic means being coupled to said adjusted amplitude output signal.

6. The control arrangement according to claim 2 wherein the signals generated by said control means are fed to said combining means.

7. The control arrangement according to claim 5 wherein said switching means also selectively couples said manual means and said automatic means to said combining means.

8. The control arrangement according to claim 4 including means for presenting a visual indication of said actual position.

References Cited

UNITED STATES PATENTS

| | | | |
|---|---|---|---|
| 3,122,687 | 2/1964 | Romuari | 318—28 |
| 3,241,027 | 3/1966 | Albright | 318—489 |
| 3,241,015 | 3/1966 | Allen | 318—18 |
| 3,351,829 | 11/1967 | Qvarnstrom | 318—162 XR |

BENJAMIN DOBECK, Primary Examiner

U.S. Cl. X.R.

244—77; 318—30